United States Patent Office
2,958,675
Patented Nov. 1, 1960

2,958,675

STABILIZING HALOGENATED RUBBERY COPOLYMERS

Thomas H. Hakala, Union, and John J. Laffey, Elizabeth, N.J., assignors to Esso Research and Engineering Company, a corporation of Delaware No Drawing. Filed Feb. 14, 1957, Ser. No. 640,301

15 Claims. (Cl. 260—45.75)

This invention relates to the stabilization of rubbery polymeric compositions containing partially halogenated copolymers of isoolefins and multiolefins, particularly chlorinated or brominated butyl rubber. It also relates to compositions containing partially chlorinated or brominated (hereinafter referred to as chlorinated or brominated) rubbery copolymers of isoolefins and multiolefins stabilized with minor proportions of certain derivatives of thiocarbamic acids.

Copolymers of the general type hereinbefore mentioned, which are desirably chlorinated or brominated and stabilized with derivatives of thiocarbamic acids in accordance with the present invention, especially where the copolymers comprise a major proportion (preferably about 85 to 99.5%) of a $C_4$ to $C_8$ isoolefin such as isobutylene, 2-methyl-butene-1 or 3-methyl-butene-1, etc., with a minor proportion (preferably about 15 to 0.5 weight percent) of a multiolefin of about 4 to 14, preferably about 4 to 6 carbon atoms, are commonly referred to in patents and in technical literature as "butyl rubber," or GR–I rubber (Government Rubber-Isobutylene), for example in textbook "Synthetic Rubber" by G. S. Whitby. The preparation of butyl rubber is described in U.S. Patent 2,356,128 to Thomas et al. The multiolefinic component of the copolymer is preferably a conjugated diolefin such as isoprene, butadiene, dimethylbutadiene, piperylene, or such multiolefins as cyclopentadiene, cyclohexadienes, dimethallyl, allo-ocymene, vinyl fulvenes, etc. The copolymer comprising isobutylene and isoprene is preferred, although the copolymer may contain about 0.05 to 20.0, preferably about 0.2 to 5.0, parts by weight based on total reacting comonomers of such monoolefinic compounds as styrene, p-methyl styrene, alpha methyl styrene, indene, dihydronaphthalene, dichlorostyrene, p-chlorostyrene, mixtures thereof, etc. Such a copolymer has a Staudinger molecular weight between about 20,000 and 300,000, and a mole percent unsaturation between about 0.5 to 15.0.

In accordance with the present invention, it has now been found that while isoolefin-multiolefin copolymers such as butyl rubber do not respond to stabilization by certain derivatives of thiocarbamic acids and in fact tend to be cross linked or gelled by such derivatives, the halogenated derivatives of these copolymers are surprisingly improved by these stabilizing compounds as to decreased tendency to gel as exemplified by good hexane solubility and particularly as to resistance to dehydrohalogenation as exemplified by low corrosion of tinplate.

The halogenated rubbery isoolefin-multiolefin-containing copolymers, particularly chlorinated or brominated butyl rubbers, which are advantageously stabilized by derivatives of thiocarbamic acids in accordance with the present invention are derived from the foregoing isoolefin-multiolefin hydrocarbon copolymers. They are produced by carefully chlorinating and/or brominating these copolymers in a manner which does not degrade the molecular weight thereof, as more fully described hereinafter. The resulting halogenated copolymers do not require sulfur or ultra-accelerators in their vulcanization and may be vulcanized solely by zinc oxide and/or primary or polyfunctional amines. The vulcanizates and covulcanizates with other rubbery polymers such as natural rubber and GR–S rubber have been found to exhibit good stress-strain properties and to have superior heat aging resistance compared to the corresponding unhalogenated copolymers. Since these halogenated copolymers already possess heat aging resistance superior to the unhalogenated copolymers, and the unhalogenated copolymers are not improved as to heat aging resistance by the addition thereto of derivatives of thiocarbamic acids hereinafter more fully described, it is most unexpected that such derivatives have now been found to even further improve the heat aging resistance of the halogenated copolymers.

In order to produce halogenated butyl rubber, the halogenation is regulated so that the resulting rubber will contain about at least 0.5 weight percent (preferably at least about 1.0 weight percent) combined halogen but not more than about "X" weight percent combined chlorine or 3.0 "X" weight percent combined bromine wherein:

$$X = \frac{M_3 L}{(100-L)M_1 + L(M_2+M_3)} \times 100$$

and $L$ = mole percent of the multiolefin in the polymer
$M_1$ = molecular weight of the isoolefin,
$M_2$ = molecular weight of the multiolefin,
$M_3$ = atomic weight of chlorine or bromine Suitable halogenating agents which may be employed are gaseous chlorine, liquid bromine, alkali metal hypochlorites or hypobromites, $C_4$ to $C_{10}$ tertiary alkyl hypochlorites, sulfur bromides, sulfuryl chloride, pyridinium chloride perchloride, N-bromosuccinimide, alpha-chloroaceto-acetanilide, N,N'-dichloro-5,5 - dimethylhydantoin, iodine halides, trichlorophenol chloride, N-chloroacetamide, beta-bromo-methyl phthalimide, etc. The preferred halogenating agents are gaseous chlorine, liquid bromine, sulfuryl chloride, sulfuryl bromide, chlorohydantoins, bromo-hydantoins, iodine monochloride, and related materials.

The halogenation is generally conducted at temperatures above about 0° to about +100° C., depending upon the particular halogenating agent, for about one minute to several hours. An advantageous pressure range is from about 0.1 to 1000 p.s.i.a., atmospheric pressure being satisfactory. The halogenation may be accomplished by preparing a 1 to 80 weight percent solution of such copolymers as above, in a substantially inert liquid organic solvent such as a $C_3$ to $C_8$ substantially inert hydrocarbon or halogenated derivatives of saturated hydrocarbons; e.g., hexane, mineral spirits, cyclohexane, benzene, chlorobenzene, chloroform, carbon tetrachloride, mixtures thereof, etc., and adding thereto the halogenating agent, which may optionally be in solution, such as dissolved in a substantially inert hydrocarbon, an alkyl chloride, carbon tetrachloride, carbon disulfide, etc. If chlorine gas is employed, it may also be diluted with up to about 50 times its volume, preferably about 0.1 to 5.0 times its volume of a substantially inert gas such as nitrogen, methane, carbon dioxide, etc.

The resulting halogenated isoolefin-multiolefin-containing copolymer may be recovered by precipitation with oxygenated hydrocarbons, particularly alcohols or ketones such as acetone or any other known non-solvent for the halogenated butyl rubber and dried under about 1 to 760 millimeters or higher of mercury pressure absolute at about 0° to 180° C., preferably about 50° to 150° C. (e.g. 70° C.). Other methods of recovering the chlorinated polymer are by conventional spray or drum drying techniques. Alternatively, the solution of the halogenated rubber may be injected into a vessel containing steam and/or agitated water heated to a temperature sufficient to volatilize the solvent and form an aqueous slurry of the chlorinated rubber. This halogenated rubber may then be separated from the slurry by filtration and drying or recovered as a "crumb" or as a dense sheet or slab by conventional hot milling and/or extruding procedures. As so produced, the halogenated rubbery polymer has a Staudinger molecular weight within the range between approximately 20,000 to 300,000, preferably about 25,000 to 200,000, and a mole percent unsaturation of about 0.5 to 15.0.

In practicing the present invention, the resulting unvulcanized halogenated isoolefin-multiolefin-containing copolymer, prior to curing, is blended at a temperature between about 0° and 200° C. with broadly 0.05 to 20.0, generally about 0.05 to 10.0, advantageously about 0.1 to 8.0, preferably about 0.5 to 5.0 weight percent of one or more of the derivatives of thiocarbamic acids enumerated hereinafter. This may be accomplished in several manners. In a preferred embodiment of the invention substantially all of the organic stabilizing compound required is blended with the unvulcanized halogenated copolymer slurry when the copolymer is recovered (i.e., precipitated and/or injected into a hot aqueous medium) but prior to the drying, milling and/or extruding steps. In another preferred embodiment, the organic stabilizing compound is added to the halogenated copolymer solution prior to recovering the copolymer by spray drying and/or drum drying and/or precipitation and/or injection into a hot aqueous medium. Alternatively, the organic stabilizing compound or compounds may be added on a cold mill or Banbury prior to vulcanization. However, it is especially desirable to blend with the halogenated copolymer at least 0.5 or 1.0 part, per hundred parts of copolymer, of at least one of the organic stabilizing compounds prior to such finishing operations as spray drying, drum drying, hot milling, extruding or calendering since the organic stabilizing compound substantially prevents dehydrohalogenation, cross linking or gelling and degradation or breakdown of the halogenated copolymer during these operations.

The organic stabilizing compounds employed in accordance with the present invention may have boiling points between about 100° and 700° C. and are chosen from the two categories enumerated hereinafter, the members of all of which may be used singly or in combination:

(I) Thiuram sulfides of the general formula

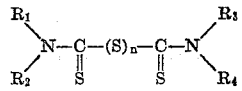

wherein $R_1$, $R_2$, $R_3$ and $R_4$ are selected from the group consisting of $C_1$ to $C_{18}$ alkyl, aryl, alkaryl and aralkyl groups, $n$ being an integer between about 1 and 4. Typical organic stabilizing compounds falling within category (I) include tetramethyl thiuram monosulfide, tetramethyl thiuram disulfide, tetraethyl thiuram disulfide, di-N-pentamethylene thiuram tetrasulfide, mixtures thereof, etc. It is preferred to use those thiuram sulfides in which $n$ is 1 in amounts of at least about 1.0 weight percent based on halogenated copolymer. It will be noted that compounds of category (I) are oxidation products of dialkyl, diaryl, dialkaryl or diaralkyl dithiocarbamic acids.

(II) Amine or group IV or V metal salts of dithiocarbamic acid such as N-pentamethylene ammonium pentamethylene dithiocarbamate, lead dimethyl dithiocarbamate, bismuth dimethyl dithiocarbamate, mixtures thereof, etc. It is preferred to use the metal dithiocarbamates in amounts of at least about 1.0 weight percent based on halogenated copolymer.

The foregoing compositions comprising chlorinated isoolefin-multiolefin-containing copolymers and organic stabilizing compounds may be hot-milled, extruded, calendered or dried with facility, in accordance with conventional practice, without substantial dehydrohalogenation or thermal degradation. One hundred parts by weight of these resulting compositions are then advantageously compounded with about 10 to 150 parts by weight of a filler or fillers; about 2 to 30 parts by weight of zinc oxide and/or primary or polyfunctional amines; plasticizers such as hydrocarbon oils, tars, waxes, resins or organic esters; pigments; magnesium oxide and/or calcium oxides; quinone dioxime or its derivatives or homologues; and accelerators such as mercapto-benzothiazole, benzothiazyl disulfide, etc. The compounded stocks formed may then be cured into vulcanizates possessing outstanding tensile strengths by heating the same at temperatures between about 200° and 450° F., preferably about 250° to 400° F., for times between about a few seconds to several hours.

The stabilized, halogenated isoolefin-multiolefin copolymers (particularly halogenated butyl rubbers, stabilized in accordance with the invention) may also be cured by zinc oxide and/or primary or polyfunctional amines in the presence of minor proportions of resinous polymerized hydroxy (or preferably ring alkylated hydroxy) aromatic (or heterocyclic) dialcohol compounds, particularly about 0.1 to 20, preferably about 0.5 to 10.0 weight percent of dimethylol phenolic resins such as 2,6-dimethylol-4-t-octyl phenol or the like. The foregoing dialcohol resins are produced by heating the monomeric phenol dialcohol at temperatures of between about 75° and 175° C.; (e.g., 125° C.), care being taken to terminate the reaction while the resin is in the soluble (i.e., in organic solvents) and fusible state. The stabilized, halogenated butyl rubber may also be blended with about 0.5 to 10%, of a group II metal silicate, particularly calcium silicate, and/or with about 1 to 5% of an adsorbent deactivator such as various high boiling polar compounds, e.g., ethylene glycol, during or preferably before the rubber is compounded and cured. Vulcanizates or covulcanizates of this last-mentioned type are especially useful in tires (especially in the carcass, undertread and bead areas), in tire casing curing bags or diaphragms, and in steam hose or similar articles. The vulcanization conditions for such compositions are generally as hereinbefore mentioned.

In order to more fully illustrate the present invention, the following experimental data are given.

CHLORINATED BUTYL RUBBER "A"

A copolymer of about 97% isobutylene and 3% isoprene having a viscosity average molecular weight of 320,000 was dissolved in hexane to form a 10% solution. To this polymer solution, a 20 weight percent (based on the polymer) of liquid sulfuryl chloride as the chlorinating agent was added and reacted for 30 minutes with the polymer at room temperature. The resulting chlorinated interpolymer was precipitated with acetone, collected and redissolved in hexane three times and ultimately dried and analyzed and found to have a viscosity average molecular weight of 320,000 and to contain 1.4% chlorine based on the polymer. The physical characteristics of both zinc oxide and diamine-cured vulcanizates, containing this chlorinated interpolymer, were excellent.

HALOGENATED RUBBERS "B" TO "L"

Other examples of halogenated isoolefin-multiolefin copolymers which can be used are tabulated hereinafter, the amount of isoolefin and multiolefin in copolymer, halogenation agent, and amount of halogen combined in the copolymer being as follows:

| Halogenated Rubber | Isoolefin, Percent[1] | Multiolefin, Percent[1] | Halogenation Agent | Percent, Halogen in the Rubber[1] |
|---|---|---|---|---|
| B | Isobutylene (98) | Isoprene (2) | $SO_2Cl_2$ | 1.2 Chlorine. |
| C | Isobutylene (95) | Isoprene (5.0) | $Cl_2$ in $CCl_4$ | 2.5 Chlorine. |
| D | Isobutylene (94) | Cyclopentadiene (6) | ___do___ | 2.0 Chlorine. |
| E | Isobutylene (92) | Myrcene (8.0) | ___do___ | 1.6 Chlorine. |
| F | 2-methyl-butene-1 (95) | Isoprene (5) | ___do___ | 1.3 Chlorine. |
| G | 3-methyl-butene-1 (96) | Butadiene (4) | ___do___ | 1.7 Chlorine. |
| H | Isobutylene (98) | 1-vinyl cyclohexene-3 (2) | ___do___ | 0.8 Chlorine. |
| I | Isobutylene (92) | Butadiene (8) | Gaseous Chlorine | 2.8 Chlorine. |
| J | Isobutylene (85) | Isoprene (15) | ___do___ | 6.6 Chlorine. |
| K | Isobutylene (98) | Isoprene (2) | N-N'-dichloro-5,5-dimethyl hydantoin. | 1.1 Chlorine. |
| L | ___do___ | ___do___ | Liquid Bromine | 2.3 Bromine. |

[1] NOTE.—Percent in all instances is percent by weight.

CHLORINATED BUTYL RUBBER "M"

An additional run was made chlorinating a commercial rubber corresponding to GR-I-25 butyl rubber dissolved in benzene. The rubber had a Mooney viscosity at 212° F. for 8 minutes of 43, and a mole percent unsaturation of 2.3. The chlorination of a solution of the uncured butyl rubber was conducted in a 500-ballon glass-lined Pfaudler reactor equipped with an agitator, baffle, submersed stainless steel sparger ring and a conduit leading into the ring.

Gaseous chlorine was continuously added to the butyl rubber solution over a period of ½ hour at a temperature level of 30° C. and under atmospheric pressure. The chlorine was added to the reactor through the conduit via the sparger ring which, as hereinbefore mentioned, was immersed below the liquid level of the agitated butyl rubber solution. The chlorination was then terminated and the solution containing the chlorinated butyl rubber formed was agitated for an additional 10 minutes. The resulting solution of chlorinated butyl rubber was then water washed three times to remove dissolved hydrogen chloride.

The absolute amount of butyl rubber, benzene solvent and gaseous chlorine daded, as well as the calculated percent of added chlorine based on polymer and resulting percent of chlorine combined in the polymer were as follows:

Butyl rubber _____ 170 lbs.
Benzene solvent _____ 1540 lbs.
Chlorine added _____ 4.8 lbs. (i.e. 2.8%)
Chlorine combined in the polymer __ 1.28%

The resulting water-washed solution containing the stabilized, chlorinated rubbery butyl rubber "M" was then recovered by injecting the dissolved, chlorinated polymer into an agitated aqueous solution containing a commercial wetting agent of the aliphatic polyoxyethylene ether type (Sterox A.J.) in an amount of 0.6 pound per 100 pounds of chlorinated rubber as a dispersing aid. The hot aqueous solution employed contained 4170 pounds of water per 100 pounds of chlorinated butyl rubber. The agitated solution was maintained at a temperature between about 190° and 210° F. (e.g., 200° F.) whereby to flash off the benzene solvent and form an aqueous slurry of the chlorinated butyl rubber in water. This slurry was then filtered and the chlorinated butyl rubber, which was in the form of a wet "crumb," was placed in a Proctor and Schwartz tray drier maintained at 180° F. (i.e., 82° C.) and dried for ten hours. The crumb depth on the tray was about ½ inch. The crumb was then completely dried and compacted by milling for 10 minutes on a conventional rubber mill having a roll temperature of 260° F. (i.e. 127° C.).

Example I

One hundred parts by weight of chlorinated butyl rubber "M" were compounded on a cold mill (e.g. 20° C.) with 1.0 part by weight of the thiuram sulfide stabilizers indicated hereinafter. Portions of the respective blends were placed on tin plate and aged for 30 minutes in a circulating air oven at 297° F. Hydrogen chloride evolution was evidenced by corrosion of the tin plate and gelation was evidenced by incomplete solubility in hexane compared to a control of chlorinated butyl rubber "M" containing no added stabilizer. Certain samples were also tested for chlorine content after the above oven heat aging. The results were as follows:

| Stabilizer | Aged | Tin Plate Corrosion | Solubility in Hexane | Weight Percent Chlorine |
|---|---|---|---|---|
| None (i.e. control) | No | None | Soluble | 1.28 |
| Do | Yes | Severe | Insoluble | 0.67 |
| Tetramethyl thiuram monosulfide. | Yes | None | Soluble | 1.28 |
| Tetramethyl thiuram disulfide. | Yes | ___do___ | ___do___ | 1.28 |
| Tetraethyl thiuram disulfide. | Yes | ___do___ | ___do___ | 1.27 |
| Di-N-pentamethylene thiuram tetrasulfide. | Yes | ___do___ | ___do___ | |

The above data show that thiuram sulfides stabilize chlorinated butyl rubber against loss of halogen or dehydrohalogenation and gelation in accordance with the present invention.

Example II

The same general procedure as in Example I was repeated substituting various group IV and V metal salts or amine salts of dithiocarbamic acid for the thiuram sulfides of Example I with the following results:

| Stabilizer | Tin plate corrosion | Solubility in hexane | Weight Percent Chlorine |
|---|---|---|---|
| None (i.e. control) (not aged) | None | Soluble | 1.28 |
| None (i.e. control) | Severe | Insoluble | 0.67 |
| Tellurium dimethyl dithiocarbamate. | Corroded | ___do___ | |
| Zinc dimethyl dithiocarbamate | ___do___ | ___do___ | |
| Lead dimethyl dithiocarbamate | None | Soluble | 1.27 |
| Bismuth dimethyl dithiocarbamate | ___do___ | ___do___ | 1.27 |
| N-pentamethylene ammonium pentamethylene dithiocarbamate. | ___do___ | ___do___ | 1.28 |

The above data show that amine or group IV or V metal dithiocarbamates stabilize chlorinated butyl rubber against loss of halogen or dehydrohalogenation and gelation but that group II and VI metal dithiocarbamates do not.

Resort may be had to modifications and variations of the disclosed embodiments without departing from the spirit of the invention or the scope of the appended claims.

What is claimed is:

1. An unvulcanized, stabilized composition which consists of a halogenated rubbery copolymer of about 85 to 99.5% of a $C_4$ to $C_8$ isoolefin and about 0.5 to 15% of a $C_4$ to $C_{14}$ multiolefin and about 0.05 to 20.0 weight percent based on said halogenated copolymer of a derivative of thiocarbamic acid selected from the group consisting of thiuram sulfides, lead dimethyl dithiocarbamate, bismuth dimethyl dithiocarbamate, and N-pentamethylene ammonium pentamethylene dithiocarbamate.

2. A composition according to claim 1 in which the halogenated copolymer contains at least about 0.5 weight percent chlorine but not more than about 1 combined atom of chlorine per double bond in the copolymer.

3. A composition according to claim 1 in which the halogenated copolymer contains at least about 0.5 weight percent bromine but not more than about 3 combined atoms of bromine per double bond in the copolymer.

4. A composition according to claim 1 in which the thiocarbamic acid derivative is present in an amount between about 0.1 and 10.0 weight percent based on halogenated copolymer.

5. A composition according to claim 1 in which the thiocarbamic acid derivative is a thiuram sulfide of the general formula:

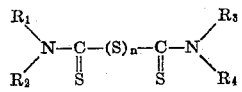

in which $R_1$, $R_2$, $R_3$ and $R_4$ are selected from the group consisting of $C_1$ to $C_{18}$ alkyl, aryl, alkaryl, and aralkyl groups, $n$ being an integer between about 1 and 4.

6. A composition according to claim 1 in which the thiocarbamic acid derivative is lead dimethyl dithiocarbamate.

7. A composition according to claim 1 in which the thiocarbamic acid derivative is N-pentamethylene ammonium pentamethylene dithiocarbamate.

8. A composition according to claim 1 in which the thiuram sulfide is a tetraalkyl thiuram sulfide.

9. A composition according to claim 1 in which the thiuram sulfide is a tetraalkyl thiuram disulfide.

10. Process for stabilizing a halogenated rubbery copolymer of about 85–99.5% of a $C_4$ to $C_8$ isoolefin and about 0.5–15% of a $C_4$ to $C_{14}$ multiolefin, against dehydrohalogenation, thermal degradation and gel formation during processing steps prior to compounding for vulcanization, which comprises compounding therewith, prior to addition of other compounding agents and curatives, a stabilizing amount of a stabilizer consisting of a thiocarbamic acid derivative selected from the group consisting of thiuram sulfides, lead dimethyl dithiocarbamate, bismuth dimethyl dithiocarbamate, and N-pentamethylene ammonium pentamethylene dithiocarbamate.

11. Process according to claim 10, in which the stabilizer is added prior to the finishing steps in the recovery of said halogenated copolymer after preparation thereof by halogenation of said isoolefin-multiolefin copolymer.

12. Process according to claim 10, in which the stabilizer is added prior to any drying, hot-milling, Banburying and extruding operations.

13. Process according to claim 10, in which the stabilizer is added on a cold mill.

14. An unvulcanized, stabilized composition consisting of a chlorinated rubbery isobutylene-isoprene copolymer having a Staudinger molecular weight of about 20,000 to 300,000 and a mole percent unsaturation of about 0.5 to 15, and containing at least 0.5% of chlorine but not more than about one combined atom of chlorine per double bond in the copolymer, and homogeneously compounded therewith about 0.5 to 5.0% of a stabilizer consisting of bismuth dimethyl dithiocarbamate.

15. An unvulcanized stabilized composition consisting of a halogenated rubbery copolymer of about 85 to 99.5% of a $C_4$ to $C_8$ isoolefin and about 0.5 to 15% of a $C_4$ to $C_{14}$ multiolefin and about 0.05 to 20.0 weight percent based on said halogenated copolymer of bismuth dimethyl dithiocarbamate.

References Cited in the file of this patent

UNITED STATES PATENTS

| | | |
|---|---|---|
| 2,259,122 | Walker | Oct. 14, 1941 |
| 2,375,042 | Semon | May 1, 1945 |
| 2,387,518 | Lighbown et al. | Oct. 23, 1945 |
| 2,732,354 | Morrisey et al. | Jan. 24, 1956 |
| 2,747,978 | Closson et al. | May 29, 1956 |